United States Patent

[11] 3,630,226

| | | |
|---|---|---|
| [72] | Inventor | Elton R. Develter<br>Corning, Calif. |
| [21] | Appl. No. | 878,695 |
| [22] | Filed | Nov. 21, 1969 |
| [45] | Patented | Dec. 28, 1971 |
| [73] | Assignee | Maywood Packing Company<br>Corning, Calif. |

[54] ANAEROBIC STORAGE APPARATUS
13 Claims, 5 Drawing Figs.

[52] U.S. Cl..................................................... 137/575,
220/5
[51] Int. Cl......................................................... B65d 87/02
[50] Field of Search............................................ 137/575,
572; 220/5, 1 B, DIG. 14

[56] References Cited
UNITED STATES PATENTS

| 1,494,818 | 5/1924 | Shean............................ | 220/5 |
| 1,661,029 | 2/1928 | Boyd............................. | 137/575 X |
| 2,693,703 | 11/1954 | Rawson......................... | 220/5 X |
| 2,752,971 | 7/1956 | Tupper.......................... | 220/DIG. 14 |
| 2,787,397 | 4/1957 | Radford......................... | 220/5 |
| 3,254,796 | 6/1966 | Wright........................... | 137/575 X |

Primary Examiner—M. Cary Nelson
Assistant Examiner—R. B. Rothman
Attorney—Townsend and Townsend ABSTRACT: Perishable foods are placed in airtight container that is filled with an edible, biodegradable solution under the exclusion of air for treating, e.g. pickling foods such as vegetables and fruits. Means are provided for withdrawing gases generated in the container from an uppermost, interior point of the container and for replacing the withdrawn volume of gas with additional solution stored in a separate reservoir. Upon termination of the food-treating process the solution is discarded and decomposes under atmospheric conditions, thereby preventing undesirable pollution of the environment. The treated food product is removed from the container and further processed.

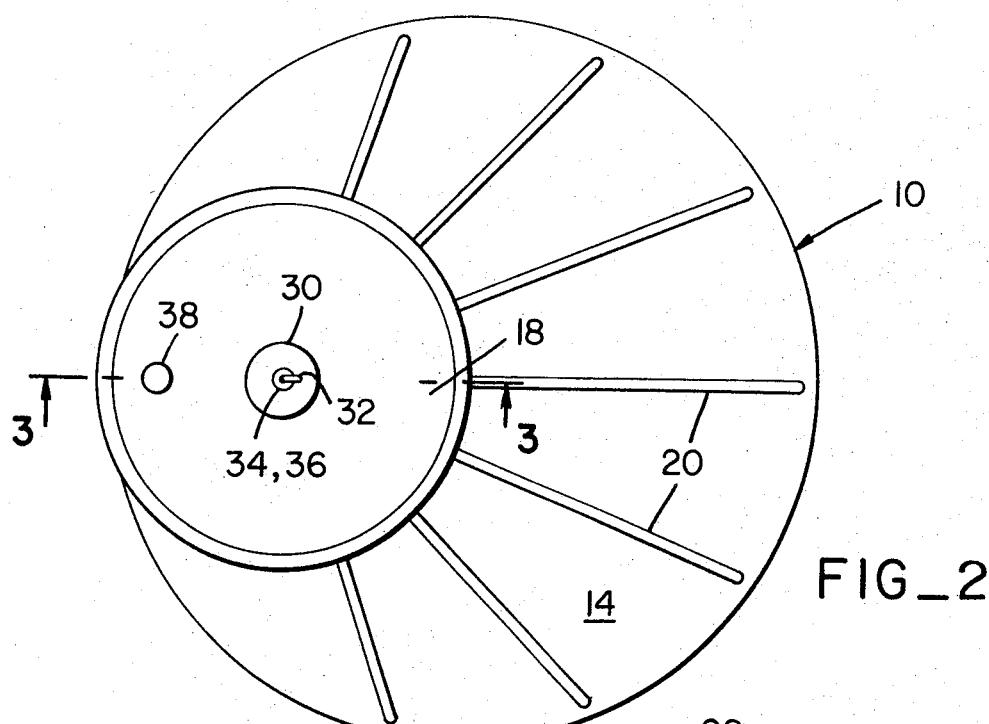
FIG_2
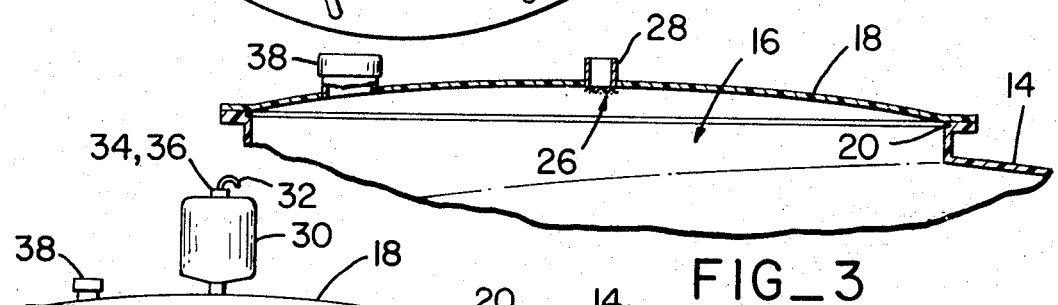
FIG_3
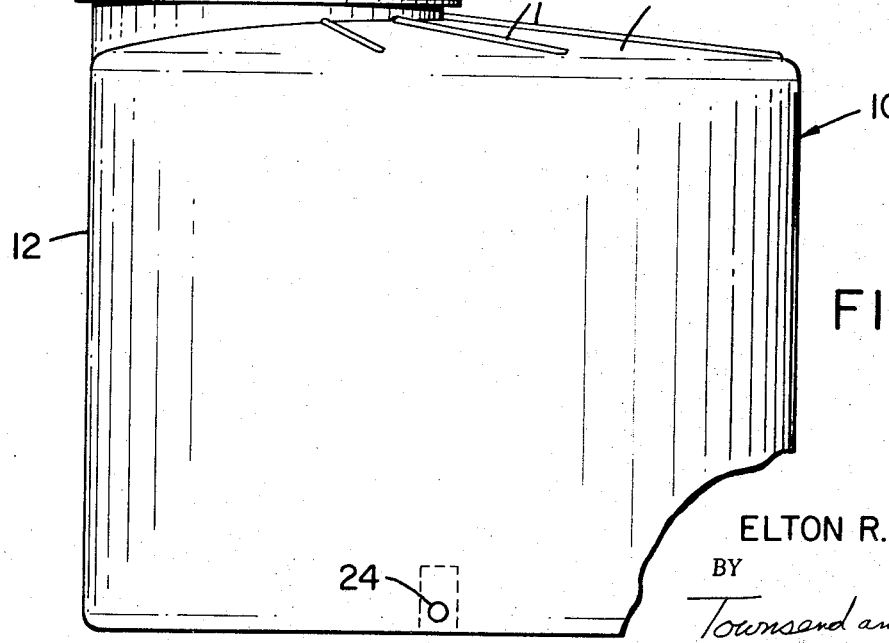
FIG_1
INVENTOR.
ELTON R. DEVELTER
BY
Townsend and Townsend
ATTORNEYS

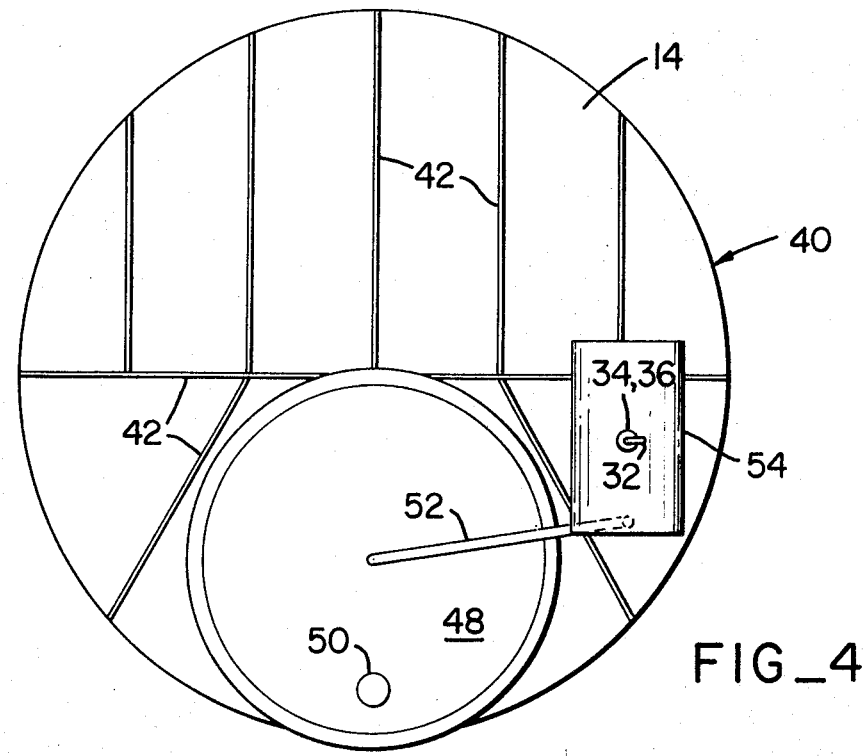
FIG_4
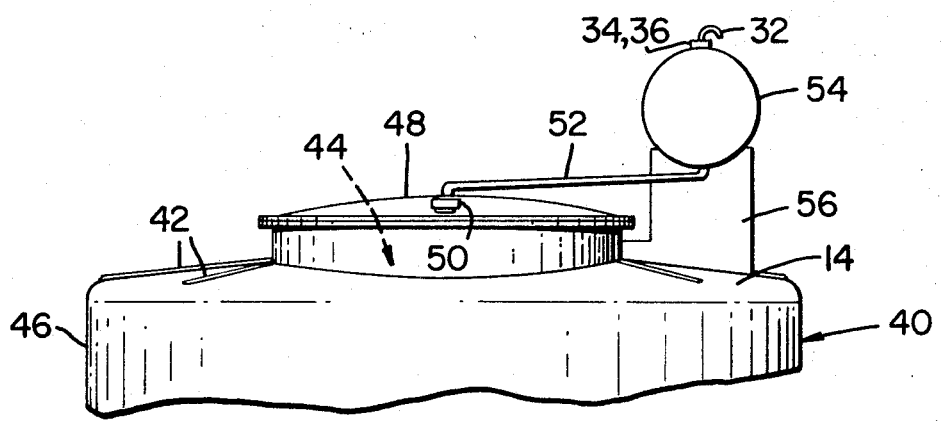
FIG_5
INVENTOR.
ELTON R. DEVELTER
BY
Townsend and Townsend
ATTORNEYS

ANAEROBIC STORAGE APPARATUS

BACKGROUND OF THE INVENTION

Certain perishable food-treating methods, such as the pickling of fruits and vegetables, requires the storage of the food product in a salty solution for extended periods of time, often for many weeks and months. In the past it has been common to place the product in large, open vats or similar containers filled with a sodium chloride (salt) solution or brine.

The sodium chloride brine penetrates the food product, imparts certain taste characteristics thereto and protects the product from contact with the atmosphere. Thereafter softening or spoilage of the product from contact with atmospheric micro-organisms is prevented. The sodium chloride brine itself is inert to atmospheric contaminants and micro-organisms. The latter are controlled in the brine provided the brine has a sufficient concentration of sodium chloride-produced acid and a minimum amount of air.

The above-described prior art food-treating process generally results in satisfactory food products. However, the need for a certain minimum salinity of the brine can impart excessive and undesirable saltiness to the product. A more serious shortcoming of the process is the need for discarding the stale brine after its use to prevent it from altering the taste of foods and yielding an inferior product. The sodium chloride in the brine is not biodegradable, that is upon discharge it is not decomposed. Consequently, unless discharged into ocean waters, discharged brine causes a serious and far reaching pollution of fresh water bodies and the surrounding soil and retards or kills plant and animal life.

SUMMARY OF THE INVENTION

In its broadest aspect the present invention provides a food-treating process in which perishable food products are placed in an edible, biodegradable solution under anaerobic conditions to prevent air from contacting the solution. Gases generated during the processing of food are withdrawn and immediately replaced by a like quantity of the solution.

The invention also provides apparatus permitting the anaerobic processing of perishable products. Briefly, the apparatus comprises an airtight container having an access hole and means defining an uppermost interior point of the container A conduit is connected to the container interior at the uppermost point and leads, in a generally upward direction, to a reservoir which holds a quantity of the solution. Gases generated in the container during the processing, i.e. the storage of the food product in the solution, are collected at the uppermost container point and passed to the reservoir while a like volume of the solution passes from the reservoir to the tank to thereby maintain the tank completely filled with the food product and the solution and prevent the entrapment of even small quantities of air. The apparatus of the invention can be used in conjunction with biodegradable solutions in accordance with the method of this invention or in conjunction with prior art methods employing sodium chloride brines.

The above-described method and apparatus of the invention permit food-treating processes, say the pickling of vegetables and fruits, without the need for placing the food products in a relatively concentrated sodium chloride brine. Instead, the food products are placed in a biodegradable solution. By enclosing the product and the solution in an air-free space decomposition of the solution and damage to the food product through softening or decomposition by micro-organism are prevented.

At the end of the storage cycle the biodegradable solution can be discharged into fresh water bodies, onto soil or into saline waters. Before discharge of the solution and organic acid therein can be removed for reuse and the B.O.D. can be changed. Atmospheric micro-organisms decompose the solution into harmless chemicals. The heretofore serious sodium chloride pollution caused by certain of the food processing industries is thereby eliminated.

Furthermore, as a result of the anaerobic storage conditions in the container salt concentrations can be selected to optimize the taste and preservation of the food product.

BRIEF DESCRIPTION OF THE DRAWINGS

FIG. 1 is a fragmentary, elevational view of a food storage container constructed in accordance with the present invention;

FIG. 2 is a plan view of the container illustrated in FIG. 1;

FIG. 3 is an enlarged, fragmentary elevational view, in section, and is taken on line 3—3 of FIG. 2;

FIG. 4 is a plan view of another embodiment of the invention; and

FIG. 5 is a fragmentary, front view of the container illustrated in FIG. 4.

DESCRIPTION OF THE PREFERRED EMBODIMENTS

Referring to FIGS. 1 through 3 a storage container 10 constructed in accordance with the present invention has an upright, preferably cylindrical configuration and is defined by a bottom member (not separately shown), upright sidewalls 12 and a top member 14. The top member includes an access opening 16 which is eccentrically located immediately adjacent the upright sidewall of the container. A dome-shape upwardly arching closure or cover 18 (best seen in FIG. 3) is suitably secured to the storage container as with threaded bolts (not separately shown). A seal ring 20 seals the interior of the container airtight from the surrounding atmosphere.

In practice storage container 10 is of sufficient size to enable large-scale food-processing operations. In a presently preferred embodiment the storage container has a capacity of about 4,000 gallons, a diameter of about 10 feet and a height between the bottom and top members of about 8 feet. For purposes more fully set forth hereinafter, it is preferably constructed of a fiber-reenforced plastic material which makes the storage container relatively light weight and convenient for use.

Access opening 16 is a manhole, and thus has a relatively large diameter such as 5 feet, to enable the filling and inspection of the interior portion of the container. The access opening is located closely adjacent the sidewalls of the container to facilitate the loading of the container with food products by employing lifting devices with a limited horizontal reach such as fork lifters (not shown) which could not be used, or which could only be used with appreciable difficulty and danger of damage to the lifter or the container if the access hole were positioned at the center of the top member. The top member also includes a plurality of stiffening ribs 22 which extend from the access opening as shown in FIG. 2. The ribs provide top member 14 with sufficient strength and rigidity to prevent breakage or undue vibration of the top member during ordinary use of the container.

Top member 14 of the storage container is inclined form the horizontal and extends upwardly from adjacent the container sidewalls 12 to access opening 16. As more fully set forth hereinafter this is of importance during use of the container.

Cover 18 is dome-shaped so that its center defines an uppermost interior point 26 of the storage container 10. A relatively small reservoir or tank 30 fluidly communicates with the interior of storage container 10 via pipefitting 28. In a presently preferred embodiment of the invention, illustrated in FIGS. 1 and 2, reservoir tank 30 is mounted directly on pipefitting 28 which requires that cover 18 has sufficient strength to support the tank.

For the above-referred-to 4,000 gallon capacity container 10 it is preferred to provide reservoir 30 with a capacity of at least about 55 gallons. The reservoir includes a vent pipe 32 provided with suitable filter means 34 such as cotton and/or a one-way valve 36 permitting the passage of gases from the interior of the reservoir to the atmosphere while preventing the passage of air and airborne contaminants such as insects into the interior of the reservoir. Finally cover 18 also includes an inspection and measuring hole 38 that is preferably covered with a removable cap as a transparent member such as glass to permit the inspection of the tank interior after pipe 28 has been closed by means of a valve (not separately shown).

Container 10 also includes a drainage opening 24 provided with suitable valving (not separately shown) to permit the drainage and/or filling of the container with liquids.

Referring to FIGS. 4 and 5, an alternative embodiment of the invention is illustrated. It comprises a storage container 40 that is identical in all respects to storage container 10 illustrated in FIGS. 1 and 2 except that stiffening ribs 42 of a somewhat different configuration than those illustrated in FIG. 2 are shown. Thus, storage container 40 also includes an access opening 44 positioned adjacent sidewalls 46 of the container and closed with a dome-shaped cover 48 in an airtight manner as described above. Cover 48 is provided with an inspection hole 50 and it defines the uppermost interior point of the container (not shown in FIGS. 4 and 5) at which point a pipe or tubing 52 extends through the cover and into the interior of the container.

Pipe 52 extends from cover 48 to a reservoir tank 54 connected to storage container 40 via a support structure 56. Thus, the pipe fluidly communicates the storage container interior with the reservoir interior. The pipe is angularly declined from the horizontal and extends in an upward direction from the cover to the reservoir.

Turning now to the process of storing, preserving and treating perishable foods, such as olives, cucumbers, beets, beans, sea-food products and beef, in accordance with the invention container 10 is first fully drained via drainpipe 24, cover 18 is removed from access opening 16 and the interior walls of the container are thoroughly cleaned and sterilized. By constructing the container of materials such as fiber-reenforced plastic the ease with which the interior of the container is cleaned and particularly the thoroughness with which it is sterilized to remove therefrom all living materials including micro-organisms is much greater than as compared to conventional wooden vats and the like. If desired the container can be constructed of other inert materials such as stainless steel, although its construction of fiber-reenforced plastics is preferred for weight considerations.

After the container has been cleaned it is filled with the perishable food product, say olives, which are placed in the container through access opening 16. The positioning of the access opening closely adjacent the container sidewall substantially facilitates the ease with which the food product is inserted in the container. The container is filled to a level from between a few inches up to a foot or more below top member 14.

The container is now filled with a liquid food-preserving and treating-solution by pumping the solution into the container via drainpipe 24, or alternatively, through open access opening 16. After the solution level is just below the rim of the access opening cover 18 is placed thereon and the interior of the storage container is sealed from the atmosphere. Additional solution is placed into reservoir 30 which flows into the storage container while remaining air is evacuated therefrom through pipefitting 28 and into the reservoir. Additional solution is placed into the reservoir and flows into the storage container through pipefitting 28 while air is evacuated from the container through the open inspection hole 38 (which is thereafter closed) or through fitting 28 into the reservoir.

After the tank is completely filled with the solution and all air has been evacuated therefrom the fluid level in reservoir 30 is adjusted to provide ample excess fluid while permitting fluid expansion under temperature changes without interior pressure buildups. Air or gas from respiration or fermentation collects at the upper end of the reservoir is discharged through vent pipe 32.

Gases generated during the storage of the perishable food rise in the tank and if they contact top member 14 they pass in an upward direction along that member until they enter access opening 16 where they collect at the uppermost interior point 26 of the container. From there the gases rise through pipefitting 28 into reservoir 30 while a like volume of solution passes from the reservoir into the storage container. The contents of the storage container are thereby completely isolated from the atmosphere to assure the storage of the perishables under anaerobic conditions and the formation of large gas pockets, which could prevent full coverage of the perishables by the solution, is eliminated.

To remove perishables from the container 10 reservoir 30 is disconnected from the interior of the storage container, as by closing a shutoff valve (not separately shown) between the reservoir and cover 18, and the solution is drained from the storage container through drainpipe 24. To prevent the occurrence of off-flavors, discoloration, etc. the solution is discarded into adjacent bodies of water, sumps or the like. Thereafter cover 18 is lifted and the food in the container is removed therefrom through access opening 16 or an independent food removal opening (not separately shown) in the bottom member or one of the sidewalls of the storage container.

As already referred to at the beginning of this specification the airtight, anaerobic container of the present invention permits the use of biodegradable, edible solutions which, when discharged, decompose and do not cause pollution. It also seals the contents of the container from airborne dirt and contaminants which tended to collect in prior art containers.

In a presently preferred application of this invention for the storage and treatment of olives, which were heretofore treated and stored in a sodium chloride brine, the olives are placed into the container and the following solution is prepared. An edible, biodegradable organic salt, such as the salt of benzoic or sorbic acid (2,4 hexadienoic acid potassium salt or sodium benzoic slat) is dissolved in water so that the solution has a total salt concentrations of about 0.3 percent by weight although concentrations of between about 0.3 percent and about 0.35 percent have yielded satisfactory results. A biodegradable, edible organic acid, such as lactic acid (alpha hydroxy proprionic acid) or acetic acid (vinegar) is further added to the solution so that it is present at a rate of about 1.3 to about 1.7 percent by weight to provide the solution with a pH of between 3.5 and 4.2. The olives can be stored in this solution under anaerobic conditions for as long as 18 months, although ordinary food-treating processes will normally shorten the required time appreciably. After drainage of the solution and removal of the olives from the storage container the olives are firm, exhibit a true color and have an excellent, pickled flavor and they are free from shrivel.

I claim:

1. Apparatus for the anaerobic storage of large quantities of goods comprising an upright generally cylindrical closeable container for receiving a quantity of the goods and a liquid solution, the container having a top member with a generally circular outline secured to the container, the top member including an access opening positioned substantially off a center of the top member to facilitate the loading of the container with the goods, means defining an uppermost point on the interior of the container, a reservoir for holding a quantity of a liquid, and fluid communication means interconnecting the uppermost interior point of the container and a substantially lowermost point of the interior of the reservoir for establishing a flow passage to the container for the liquid in the reservoir, the fluid communication means extending generally upwardly from the container to the reservoir and having at least a horizontal orientation at all points between the container and the reservoir to permit the escape of gases from the container to the reservoir and the simultaneous replacement of the escaped gases with a like volume of liquid from the reservoir.

2. Apparatus according to claim 1 wherein the means defining the uppermost point comprises a removable manhole cover sealingly placed over the access opening, wherein the reservoir is mounted to the cover, and wherein the fluid communication means comprises a substantially vertically disposed section of a tubular member interconnecting the cover and the reservoir.

3. Apparatus according to claim 1, including a generally domed cover defining the uppermost point and closing the opening, and further including means for mounting the reservoir to the container, and wherein the fluid communication means comprises a tubular member connected to the cover and the reservoir and having an upward inclination from the cover to the tank.

4. Apparatus according to claim 1 including a cover removably and sealingly placed over the opening, and including means for securing the reservoir to the cover.

5. Apparatus according to claim 4 wherein the cover forms the means defining the uppermost point.

6. Apparatus according to claim 5 wherein the reservoir is mounted substantially vertically above the uppermost point.

7. Apparatus according to claim 1 wherein the opening is positioned closely adjacent an upright wall of the container.

8. Apparatus for storing solids and liquids under the exclusion of air from the exterior of the apparatus, the apparatus comprising: an airtight, upright container constructed of a reinforced plastic material, the container including an access opening at its uppermost portion, the opening being positioned immediately adjacent upright container walls to facilitate the insertion of the material in the container, cover means for closing the opening airtight, a portion of the cover defining an uppermost point of the container interior, a reservoir for holding a quantity of a liquid, means for mounting the reservoir so that at least a portion of the reservoir is at a higher elevation than the portion of the cover, conduit means fluidly interconnecting the interior of the container and the interior of the reservoir, the conduit means being connected to the cover portion at the uppermost interior container point and a portion of the reservoir disposed higher than the cover, the conduit means being generally upwardly inclining from the point of its connection to the cover means to the point of its connection to the reservoir, whereby gases formed in the filled container escape to the reservoir and are replaced with an equal volume of the liquid from the reservoir.

9. Apparatus according to claim 8 wherein the reservoir includes means permitting gases collected therein to escape to the atmosphere, and means preventing air and atmospheric contaminants from entering the reservoir.

10. Apparatus according to claim 8 wherein a top member of the container defines the opening and is connected to the upright container sidewalls, the top member sloping upwardly from adjacent the upright sidewalls to the opening, and wherein the cover means is dome-shaped to define the uppermost container point at about the center of the cover.

11. Apparatus according to claim 10 including a plurality of stiffeners projecting from the top member and imparting rigidity thereto.

12. Apparatus according to claim 8 wherein the mounting means includes means for securing the reservoir to the container.

13. Apparatus according to claim 8 wherein the mounting means includes means for securing the reservoir to the cover means.

* * * * *